(12) United States Patent
Denny et al.

(10) Patent No.: US 10,106,079 B2
(45) Date of Patent: Oct. 23, 2018

(54) SYSTEM AND METHOD FOR FAULT TOLERANT ROADWAY WORKER SAFETY SYSTEM

(71) Applicant: MILLER FELPAX CORPORATION, Winona, MN (US)

(72) Inventors: Joseph M. Denny, Fairport, NY (US); Muhammad Mohsin Naseer, Punjab (PK)

(73) Assignee: Miller Felpax, Winona, MN (US)

(*) Notice: Subject to any disclaimer, the term of this patent is extended or adjusted under 35 U.S.C. 154(b) by 288 days.

(21) Appl. No.: 14/864,185

(22) Filed: Sep. 24, 2015

(65) Prior Publication Data
US 2017/0088046 A1    Mar. 30, 2017

(51) Int. Cl.
| | |
|---|---|
| G08B 21/00 | (2006.01) |
| G06F 9/32 | (2018.01) |
| H03K 17/00 | (2006.01) |
| G08B 29/00 | (2006.01) |
| G08B 13/08 | (2006.01) |
| G08B 13/18 | (2006.01) |
| G08B 23/00 | (2006.01) |
| G08B 1/08 | (2006.01) |
| B60Q 7/00 | (2006.01) |
| B61L 29/24 | (2006.01) |
| H04W 24/04 | (2009.01) |
| B61L 23/00 | (2006.01) |

(Continued)

(52) U.S. Cl.
CPC .............. *B60Q 7/00* (2013.01); *B61L 23/00* (2013.01); *B61L 23/06* (2013.01); *B61L 27/0005* (2013.01); *B61L 29/24* (2013.01); *B61L 29/28* (2013.01); *B61L 29/30* (2013.01); *E01F 9/30* (2016.02); *E01F 9/654* (2016.02); *H04W 4/70* (2018.02); *H04W 24/04* (2013.01)

(58) Field of Classification Search
None
See application file for complete search history.

(56) References Cited

U.S. PATENT DOCUMENTS

| | | | |
|---|---|---|---|
| 3,167,282 A | 1/1965 | Hursh et al. | |
| 4,128,218 A * | 12/1978 | Pohlig | B61L 1/161 246/247 |

(Continued)

FOREIGN PATENT DOCUMENTS

| | | |
|---|---|---|
| EP | 2946982 A1 | 11/2014 |
| ES | 1135933 U * | 2/2015 |

*Primary Examiner* — Steven Lim
*Assistant Examiner* — Muhammad Adnan
(74) *Attorney, Agent, or Firm* — Stinson Leonard Street LLP

(57) ABSTRACT

A system for reliable detection of an approaching train and warning the roadway workers in proximity of the track is described. The system comprises at least one train detector cone (TDC) deployed along a side of an active railroad track and one or more personnel warning cones (PWC) placed near the work site, the cones configured in a wireless mesh network to provide redundant communication links. Detection of a train by the train detector cone is transmitted to the personnel warning cones which provide audible and visual warnings to nearby roadway workers. The system also includes a remote server for centralized tracking and monitoring of the train detector cones and personnel warning cones.

34 Claims, 9 Drawing Sheets

(51) Int. Cl.
  *B61L 23/06* (2006.01)
  *B61L 27/00* (2006.01)
  *B61L 29/28* (2006.01)
  *B61L 29/30* (2006.01)
  *E01F 9/30* (2016.01)
  *E01F 9/654* (2016.01)
  *H04W 4/70* (2018.01)

(56) References Cited

U.S. PATENT DOCUMENTS

| | | | | |
|---|---|---|---|---|
| 4,207,569 A * | 6/1980 | Meyer | B61L 23/06 246/121 |
| 5,038,704 A * | 8/1991 | Dean | B61L 23/06 116/173 |
| 5,129,605 A * | 7/1992 | Burns | B61L 25/021 246/122 R |
| 5,148,150 A * | 9/1992 | White | A45C 13/24 200/61.52 |
| 5,727,758 A * | 3/1998 | Penza | B61L 23/06 246/124 |
| 5,735,492 A * | 4/1998 | Pace | B61L 9/04 246/125 |
| 5,864,304 A * | 1/1999 | Gerszberg | B61L 29/18 246/122 R |
| 5,867,801 A * | 2/1999 | Denny | B61L 3/125 246/169 R |
| 5,907,294 A | 5/1999 | Welte et al. | |
| 5,924,651 A * | 7/1999 | Penza | B61L 23/06 246/124 |
| 5,954,299 A * | 9/1999 | Pace | B61L 9/04 246/125 |
| 6,020,815 A * | 2/2000 | Eslambolchi | B61L 1/06 246/292 |
| 6,113,037 A * | 9/2000 | Pace | B61L 23/06 246/124 |
| 6,145,792 A * | 11/2000 | Penza | B61L 3/125 246/122 R |
| 6,232,887 B1 * | 5/2001 | Carson | B61L 23/06 340/4.21 |
| 6,323,785 B1 * | 11/2001 | Nickell | B61L 23/06 246/292 |
| 6,371,416 B1 * | 4/2002 | Hawthorne | B61L 23/06 246/122 R |
| 7,538,666 B2 | 5/2009 | Campman | |
| 7,624,952 B1 * | 12/2009 | Bartek | B61L 23/06 246/124 |
| 7,832,691 B2 * | 11/2010 | Reibeling | B61L 29/32 246/113 |
| 8,061,662 B1 * | 11/2011 | Bartek | B61L 23/06 246/203 D |
| 8,109,474 B2 | 2/2012 | Bartek | |
| 8,157,219 B2 | 4/2012 | Ashraf et al. | |
| 8,344,877 B2 | 1/2013 | Sheardown et al. | |
| 8,773,275 B1 * | 7/2014 | Parenteau | G01S 19/16 340/539.13 |
| 8,786,428 B2 | 7/2014 | Sheardown et al. | |
| 8,952,805 B2 * | 2/2015 | Baines | G08B 21/02 340/539.12 |
| 9,767,968 B2 * | 9/2017 | Braband | H01H 9/16 |
| 9,902,411 B2 * | 2/2018 | Bartek | B61L 23/34 |
| 2004/0073342 A1 | 4/2004 | Kane | B61L 3/004 701/19 |
| 2005/0275513 A1 * | 12/2005 | Grisham | B60Q 9/008 340/435 |
| 2006/0015224 A1 * | 1/2006 | Hilleary | B61L 3/125 701/19 |
| 2006/0116837 A1 * | 6/2006 | Hager | G01C 25/00 702/95 |
| 2007/0085734 A1 * | 4/2007 | Whitehead | G01S 19/07 342/357.24 |
| 2007/0261894 A1 | 11/2007 | Harish | |
| 2007/0274158 A1 * | 11/2007 | Agam | B61L 23/041 367/96 |
| 2010/0020185 A1 | 1/2010 | Sako et al. | |
| 2010/0130873 A1 * | 5/2010 | Yuen | A61B 5/0205 600/484 |
| 2010/0163687 A1 * | 7/2010 | Brand | B61L 3/127 246/117 |
| 2011/0006912 A1 * | 1/2011 | Sheardown | B61L 23/06 340/901 |
| 2011/0009814 A1 * | 1/2011 | Tsoukalis | A61M 5/14224 604/66 |
| 2011/0030875 A1 * | 2/2011 | Conte | F16L 55/1651 156/64 |
| 2011/0278401 A1 * | 11/2011 | Sheardown | B61L 23/06 246/167 A |
| 2012/0006946 A1 | 1/2012 | Clarissou | |
| 2012/0218099 A1 * | 8/2012 | Egawa | G08B 25/009 340/502 |
| 2014/0104081 A1 * | 4/2014 | Cross | G08G 9/00 340/989 |
| 2014/0111356 A1 * | 4/2014 | LeFebvre | B61L 15/0081 340/988 |
| 2014/0210646 A1 * | 7/2014 | Subramanya | B61L 29/28 340/928 |
| 2014/0308930 A1 | 10/2014 | Tran | |
| 2015/0091716 A1 * | 4/2015 | Hathaway | B60Q 1/525 340/435 |
| 2017/0148323 A1 * | 5/2017 | Shubs, Jr. | G08G 1/13 |

* cited by examiner

SYSTEM AND METHOD FOR FAULT TOLERANT ROADWAY WORKER SAFETY SYSTEM

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a roadway worker warning system and method, and more particularly, to a train detection and warning system for train operators and roadway workers working in proximity to railroad tracks.

2. Description of Related Art

Roadway workers are always at risk of accidents if they are not sufficiently warned of approaching trains while working on and around railroad tracks. Because of the noise and commotion of construction and repair activities, workers working in the proximity of railroad tracks need to be alerted of approaching trains that they might otherwise not see or hear.

Several methods and systems are known in the prior art that attempt to provide adequate warning of approaching trains. For example, it is common for flaggers to be positioned at a specific distance from the work area so that they can warn the roadway workers of an approaching train using flags and whistles. However, loud noises generated from work activities can distract the workers making them unable to recognize visual and audible warnings provided by the flagger, the construction noise and activity can even distract the flaggers themselves, thus rendering this method unreliable for providing adequate warning and ensuring the workers' safety.

Many systems have been developed in the past to attempt to improve roadway worker's safety by detecting an approaching train and warning the roadway workers before the arrival of the train at the work site. One such system is disclosed in U.S. Pat. No. 3,167,282 which discloses the use of depression detectors connected to the rail, the detectors operable to sense a deflection in the track indicating an approaching train. The detection of a train triggers a radio signal that transmits a warning signal. However, the depression detectors are mechanical components which are mounted on the rail and require a significant amount of setup effort in order to deploy such sensors on the track. Moreover, depression detectors are the only train detection source used by this system and hence failure of the depression detector results in failure of the complete system.

Another solution is proposed in U.S. Pat. No. 7,624,952 which discloses the use of a transceiver placed on board the train, the transceiver transmitting signals continuously. The signals from the transceiver are received by personal pocket devices carried by the workers, the personal pocket devices sound an alarm upon receiving the warning signal to alert the roadway workers of the approaching train. One obvious drawback of this detection method is that a transmitting apparatus needs to be placed on board every train, without which detection and communication with the personal pocket devices is not possible. Furthermore, this approach is based on direct communication between the train transceiver and the personal pocket devices worn by the workers—which means that any radio interference can result in failure of the system.

Another solution is proposed in U.S. Pat. No. 7,624,952, for use with trains equipped with vehicle on board controls (VOBC), which can control the emergency brakes, cab displays and other on-board devices, such as tag readers. This solution suggests the placement of non-portable tags which are interfaced with nearby train signals. A tag reader placed on board the train reads the tag, the vehicle on board controls (VOBC) then warns the train operator through a cab display. A prerequisite of this detection method is that the non-portable tags need to be interfaced with the electrical train signals in order to sense the current status of the signal. However, while the portable tags can be easily placed near the tracks, the system does not address system security and the potential misplacement of the portable tags. Moreover, this system requires a separate setup on every locomotive which can read tags placed alongside the rail. This means that the detection system requires time, effort, and compliance by other parties before it can be reliably used.

Another suggested solution is the use of a portable train detector unit as disclosed in U.S. Pat. Nos. 8,109,474 and 7,624,952. The train detector unit uses dual ultrasonic sensors and is positioned adjacent to the rail in order to detect the movement of a train wheel. A primary drawback of this system is that ultrasonic sensors have a very low sensing range—about 20 inches —and thus the detection unit needs to be mounted on the rail in order to detect the train wheels. Furthermore, the mounting for the detection unit needs to be adjusted under the rail with specialized clamping means. This may prove to be dangerous if the mounting is not properly adjusted under the rail or the clamping means are not fastened enough, causing damage to the detection unit upon the passage of a train, rendering the system inoperable and leaving the roadway workers unaware of the incoming train.

Yet another approach has been described in U.S. Pat. No. 6,113,037, based on the deployment of magnetometer sensors probes near the railroad track to be monitored. On detection of a train the sensor probes send detection signals to a receiver unit through an RF transmission means. The receiver unit, upon receiving the detection signal, alerts the roadway workers through a crew warning device. One drawback of this system is that the sensitivity of the sensor probes needs to be adjusted so that a warning is generated only upon the passage of a train and not when heavy construction equipment or vehicles pass by, otherwise those vehicles may trigger false alarms. Furthermore, the probes are connected to the sensing units via wires, thus any connectivity issue with the electrical equipment may cause the sensing units to be ineffective. Furthermore, the setup of the train detection and warning equipment in a system of this type is difficult and labor intensive as it requires installation of electrical equipment and wiring arrangements for the hardware.

Another system is disclosed in U.S. Pat. No. 7,538,666, an accountability system used to provide information—such as the presence and location of personnel and objects. The system uses passive, infrared-based, low power RF transmitters and receivers in the form of locator transponders and personal transceiver devices. The personal transceiver device receives an RF signal transmitted by a locator transponder if an object is detected. The received RF signal is then retransmitted by the personal transceiver device to a command base monitor which is used to track a person moving through a building or area and monitor other working parameters of the person. Although this system can be used to detect an incoming train and warn the roadway workers, it relies on the use of a single sensor based on passive infrared radiation, for detecting trains which makes it vulnerable to false alarms under certain environmental conditions. Furthermore, the RF communication link between the locator transponder and the personal transceiver device is not redundant and radio interference can result in communication link failure and the failure of the entire system.

Thus, it can be seen that there remains a need in the art for a system to detect and warn roadway workers of approaching trains in a reliable and efficient manner.

BRIEF SUMMARY OF THE INVENTION

The present invention presents a reliable and efficient system for detection of a train approaching a work area and ensuring that the roadway workers are warned of an incoming train a sufficient amount of time before the train's arrival, and also ensuring that no roadway worker remains unaware of the approaching train. The system includes specialized train detection sensors for detecting an approaching train and transmitting a warning signal to personnel warning cones using a low power wireless mesh network. The personnel warning cones generate a visual and audible alarm to warn the roadway workers of the approaching train.

In one aspect of the present invention, a train detector cone employs multiple, simultaneously active, diverse and redundant sensors for fault tolerant train detection. In another aspect the train detector cones and the personnel warning cones use rechargeable batteries for operation.

In another aspect, the train detector cones and the personnel warning cones of the present invention communicate with each other using low duty cycle, low power radio transceivers in order to enhance the battery life. In yet another aspect, the train detector cones and the personnel warning cones of the present invention communicate over self-configuring wireless mesh networks such that the devices need only an initial action from an operator to start functioning.

In another aspect of the present invention, the train detector cones and the personnel warning cones communicate over wireless mesh networks which are self-healing such that the communication between any two cones does not fail in case of the disruption of any communication link between these devices.

In another aspect of the present invention, roadway workers are warned of the approaching train at distances far away from the train using intermediate hops of the wireless mesh network. In another aspect, the system and method of the present invention provide centralized tracking and event reporting for the train detector cones and the personnel warning cones.

In another aspect, the system and method of the present invention provide remote access to all of the events and diagnostic data of the train detector cones and the personnel warning cones.

In yet another aspect, the train detector cones and personnel warning cones of the present invention communicate over spread spectrum ISM band radio links to minimize the effects of RF interference in the ISM band. In another aspect, the personnel warning cones provide a visual and audible warning to the roadway workers if a train is detected by any of the train detector cones.

In another aspect of the present invention, the personnel warning cones communicate train warning alerts to personal wearable devices over a Bluetooth or similar suitable radio link.

In yet another aspect of the present invention, the personnel warning cones provide visual and audible warnings if any of the train detector cones is not properly oriented for correct train detection.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
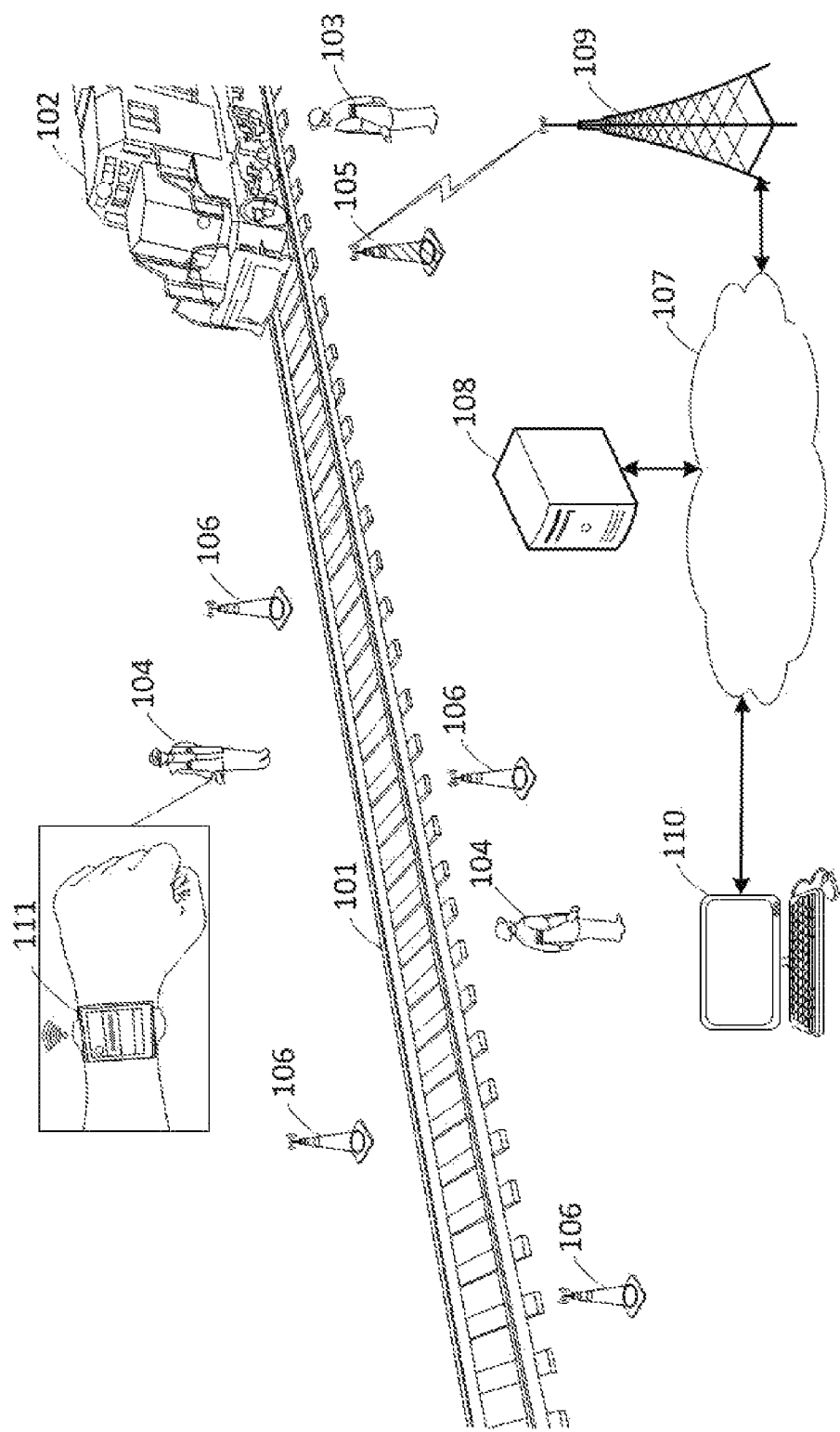
FIG. 1 is a system diagram illustrating a railroad track equipped with a roadway worker safety system according to an exemplary embodiment of the present invention.

Looking first to FIG. 1 a system according to an exemplary embodiment of the present invention is depicted. The figure depicts a train 102 approaching a work area while moving along a railroad track 101, with roadway workers 104 working near the railroad track 101. A flagger 103 (a person operating in a traditional role of spotting and alerting of approaching trains via waving a warning flag) is supported by the system and method of the present invention in detecting the approaching train 102 and warning the roadway workers before the arrival of the train at the work site.

A train detector cone 105 equipped with a diverse array of sensors for train detection is placed at a predetermined distance from the work zone. Upon detecting the approaching train 102 on the railroad track 101, the train detector cone 105 transmits a warning signal which is wirelessly relayed to a plurality of personnel warning cones 106 placed throughout the work area, the warning signal being propagated wirelessly over a secure wireless mesh network. The wireless mesh network is preferably based on spread spectrum radio frequency communications taking place in the 900 MHz ISM (industrial, scientific, and medical) band. Personnel warning cones 106 are preferably portable warning devices which provide both audible and visual alerts to the roadway workers when a train is detected by the train detector cone 105. Most preferably, personnel warning cones 106 use LED strobe lights and speakers for generating visual and audible alerts.

Other warning devices may also be used by the system, such as a wearable personal alert device (PAD) 111 configured as a wrist band, watch, or other wearable apparel. In a manner similar to the personnel warning cones, personal alert device 111 provides audible, visual, and or tactile alerts to the user upon detection of an approaching train by the train detector cone and propagation of a warning signal. Personal alert device 111 may use any of the available wireless communication means known in the art, such as Bluetooth or ISM band radio, for receiving warning alerts from the personnel warning cones. It should be understood that references to the operability of personnel warning cones as used herein encompasses the personal alert devices which may be used in conjunction with the system of the present invention.

In addition to communication with the personnel warning cones and personal alert devices, train detector cone 105 also periodically communicates all alerts and diagnostic data to a remote server 108, the communications to the remote servicer preferably take place over a cellular network 109 and IP cloud 107. Information related to important events can then be viewed remotely using a web application running on a computer 110 connected to the IP cloud 107 as shown in the figure.

Figure 2:
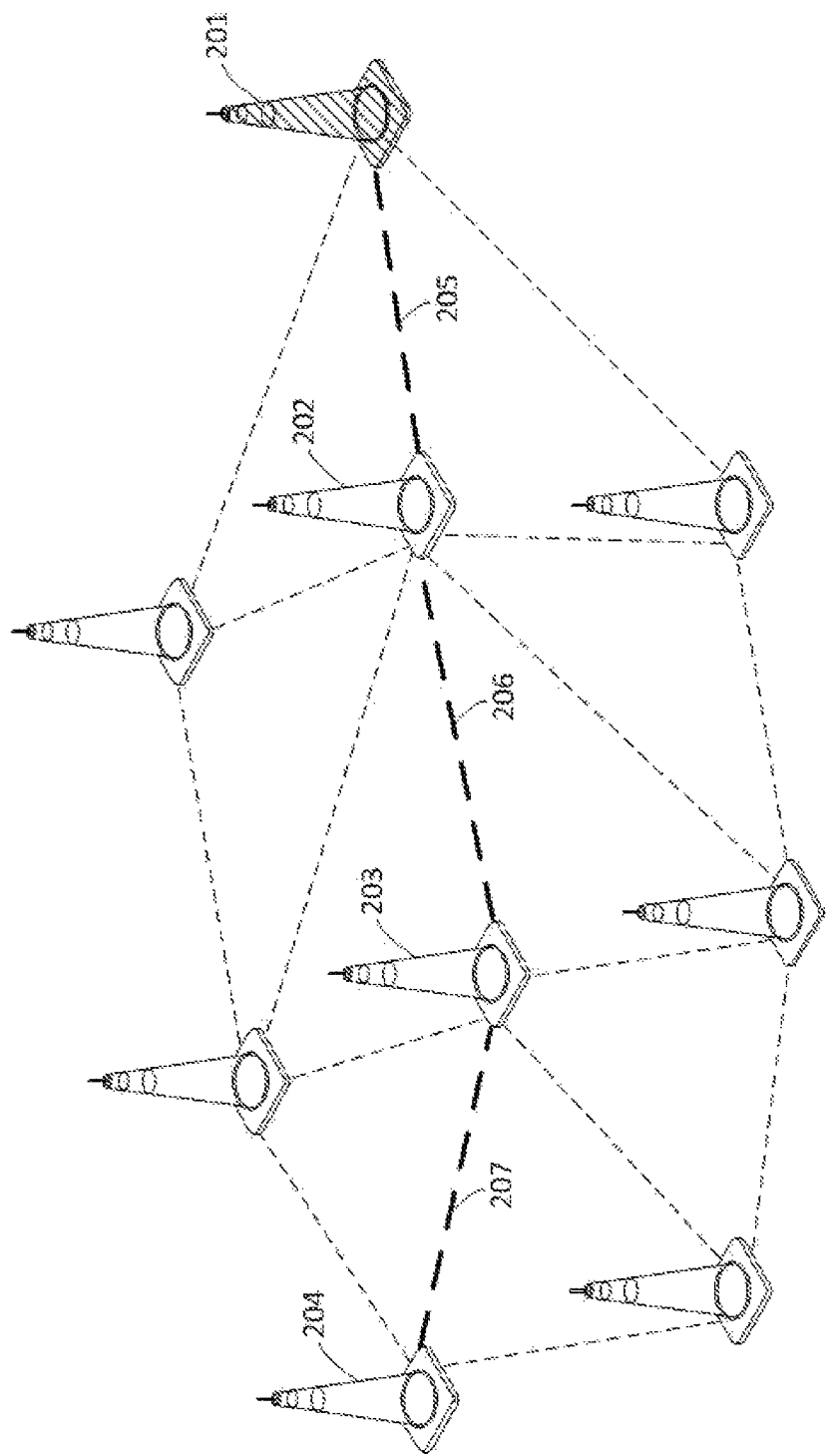
FIG. 2 is a diagram showing a wireless mesh network used for communication between train detector cones and personnel warning cones in accordance with an exemplary embodiment of the present invention.

FIG. 2 shows exemplary communication links between a train detector cone 201 and personnel warning cones 202, 203, 204, etc. in the form of a wireless mesh network. An exemplary communication path between train detector cone 201 and personnel warning cone 204 is depicted via direct wireless communication routes 205 (between the train detector cone 201 and personnel warning cone 202), 206 (between personnel warning cone 202 and personnel warning cone 203) and 207 (between personnel warning cone 203 and personnel warning cone 204). Every cone in the network preferably executes a route discovery algorithm to discover the best possible communications routes to other cones within the network. Thus, as is apparent from the figure, the best particular communication route(s) between cones is configured by the cones themselves as they establish communications with one another. The discovery algorithm executed by each cone preferably takes one or more factors into consideration in establishing the best route for communication with another cone, such as communications signal strength, orientation, or other desired factors. Most preferably, the system of the present embodiment uses the built-in functions of the DigiMesh wireless network stack provided by Digi International Inc. for route discovery and network formation. The DigiMesh network stack uses ad hoc on-demand distance vector routing algorithm for route discovery. Other algorithms including dynamic source routing algorithm, destination sequence distance vector routing algorithm or a similar can also be used for route discovery. An advantage of using a wireless mesh network instead of a single hop based point-to-point or point-to-multipoint network topologies systems is the prevention of communication failures as can occur in single hop networks and covering a larger geographical area using intermediate hops of the mesh network.

Figure 3:
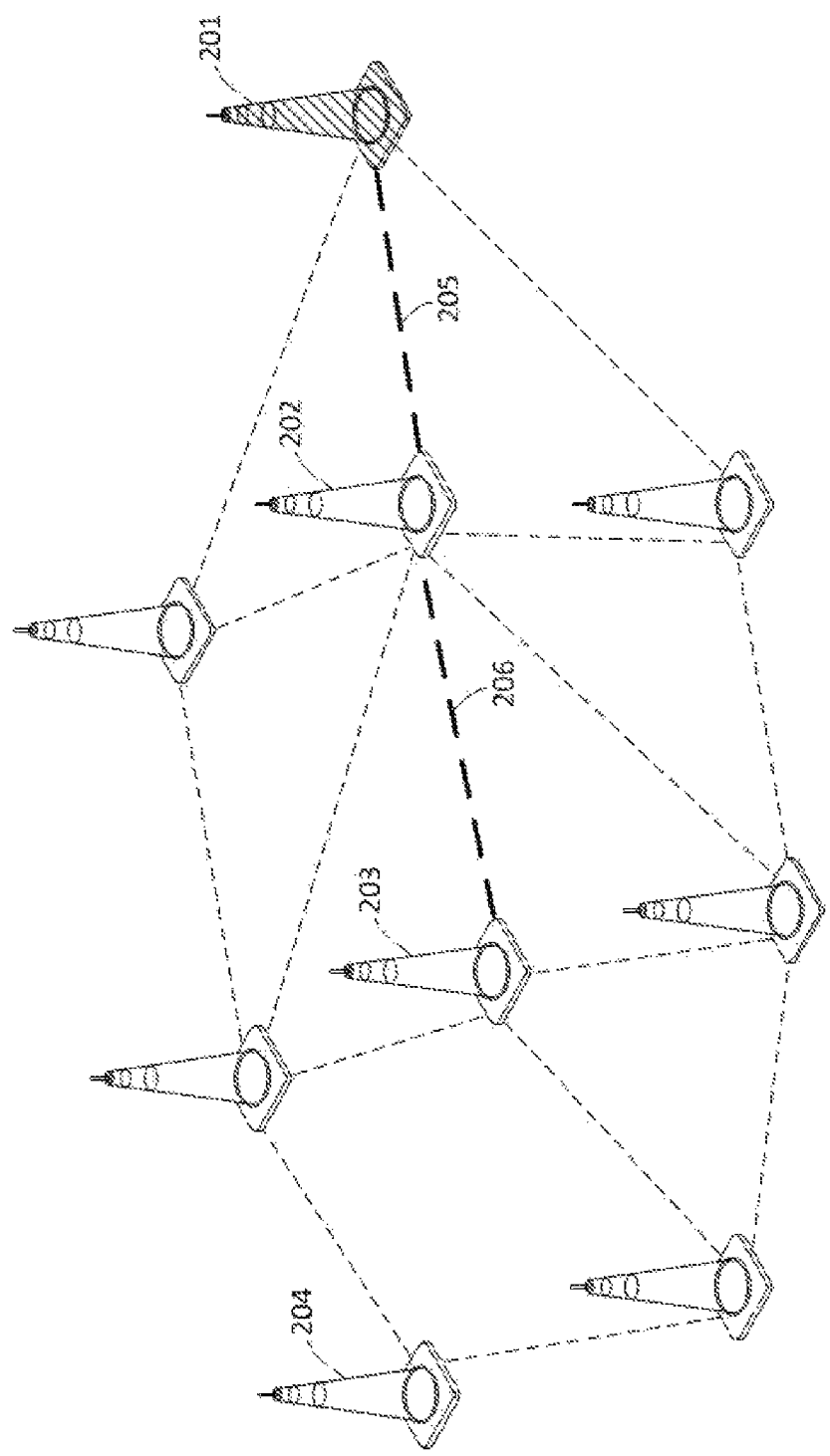
FIG. 3 depicts a wireless mesh network of a train detector cone and personnel warning cones with a broken communication link in accordance with an exemplary embodiment of the present invention.
Figure 4:
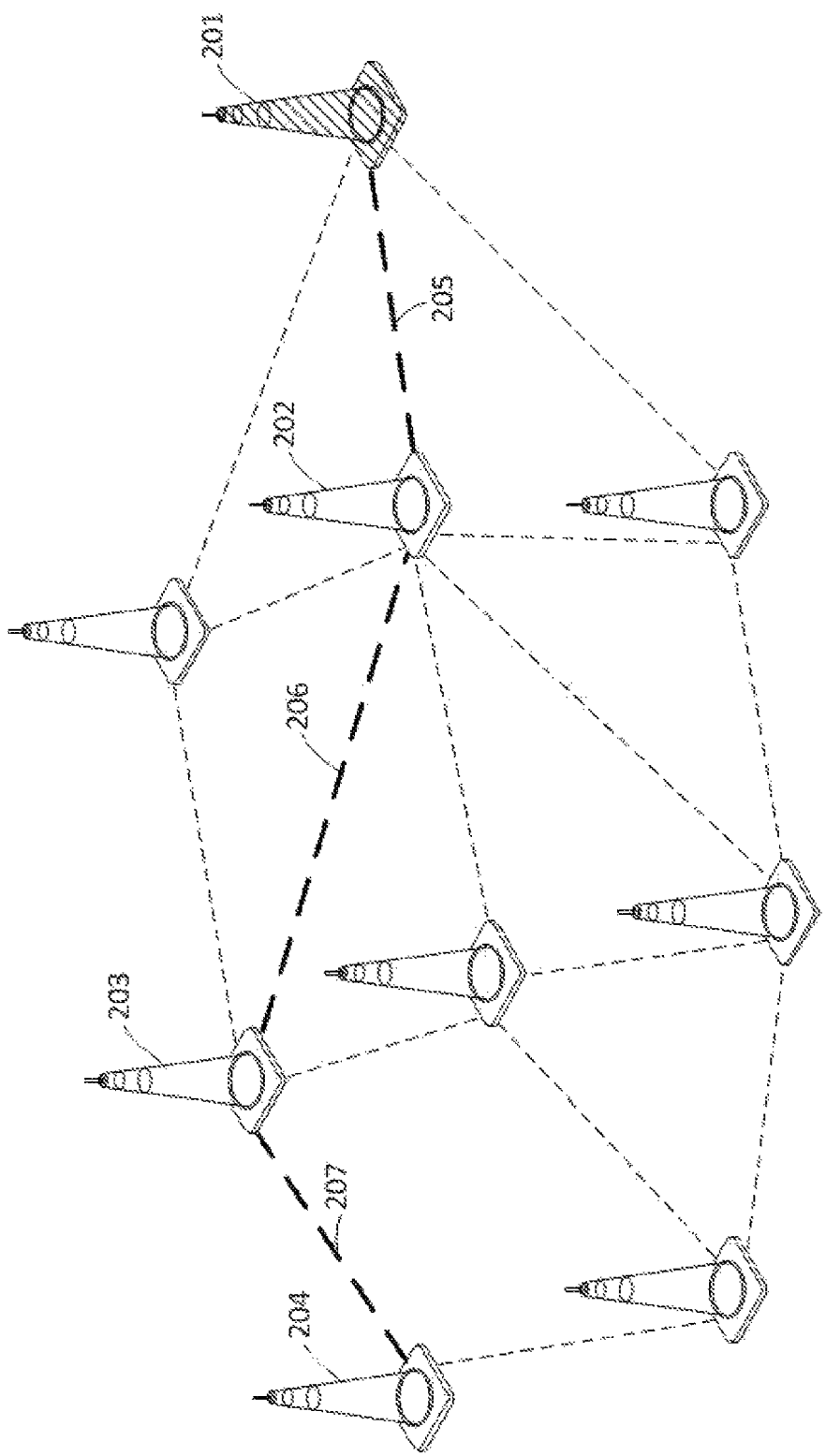
FIG. 4 illustrates an alternate communication path formed by a self-healing feature of a wireless mesh network in accordance with an exemplary embodiment of the present invention.

In an exemplary embodiment of the present invention, the wireless mesh network just described preferably includes a self-healing feature as depicted in FIGS. 3 and 4. With reference back to the communication path of FIG. 2, in FIG. 3 the communication link 207 between personnel warning cones 203 and 204 is missing (broken), indicating that the communication path has been interrupted by some event or circumstances, resulting in poor or no communication along that previous path. As depicted in FIG. 4 and described previously, the route discovery algorithm executed by each cone detects the missing or broken path, and the network self-heals, or reconfigures, to again establish communication with personnel warning cone 204. Thus, as depicted in FIG. 4, an alternate communication path is established—the warning signal is transmitted from train detector cone 201 to personnel warning cone 202 over direct wireless link 205, from personnel warning cone 202 to personnel warning cone 203 over direct wireless link 206 and from personnel warning cone 203 to the personnel warning cone 204 over direct wireless link 207.

It should be understood that the specific communication paths just discussed with respect to FIGS. 2 through 4 are exemplary in nature, and that, as illustrated in the figures, the cones within the network will self-configure to ensure that communication with all cones occurs along the paths as determined by the route discovery algorithms operable on each cone. Thus, as depicted in the figures, communication between the various cones can be established along numerous combinations of paths.

Most preferably, the wireless mesh network described in the exemplary embodiments employs a heartbeat signal that is used to synchronize all of the personnel warning cones in the network with the train detector cone. The heart beat signal is preferably broadcast by the train detector cone once every 30 seconds, and is received by all of the personnel warning cones. Upon receipt of the heartbeat signal, each personnel warning cone responds with a heartbeat signal acknowledgement signal. If the train detector cone does not receive a heartbeat signal acknowledgement from any of the personnel warning cones, it transmits a special alert that is received by all personnel warning cones, indicating that the non-responsive personnel warning cone is not working properly. The remaining personnel warning cones then recalculate and reestablish their communication routes to ensure that critical alerts generated by the train detector cone are routed to all of the working personnel warning cones—i.e., the remaining cones reconfigure their communication paths to ensure that all working cones are included and that no working cone has been isolated or cut-off from the communication network due to the inoperable cone.

It should be understood that any known wireless mesh network technology can be used to achieve reliable communications between train detector cone and personnel warning cones. Most preferably, the system uses the DigiMesh networking protocol developed by Digi International Inc. Preferably, each of the train detector cones and the personnel warning cones is preferably equipped with an XBee-PRO 900HP RF module which provides a frequency hopping spread spectrum radio communication link in the 900 MHz ISM band. The RF module preferably implements the DigiMesh wireless networking stack to establish a self-healing wireless mesh network. The DigiMesh networking protocol provides a simple and easy to use implementation, however, other wireless mesh network protocols such as Zigbee Pro, Dust networks, 6LoWPAN or a proprietary mesh protocol based on the IEEE 802.15.4 WPAN standard can also be used to implement the system and method of the present invention.

Figure 5:
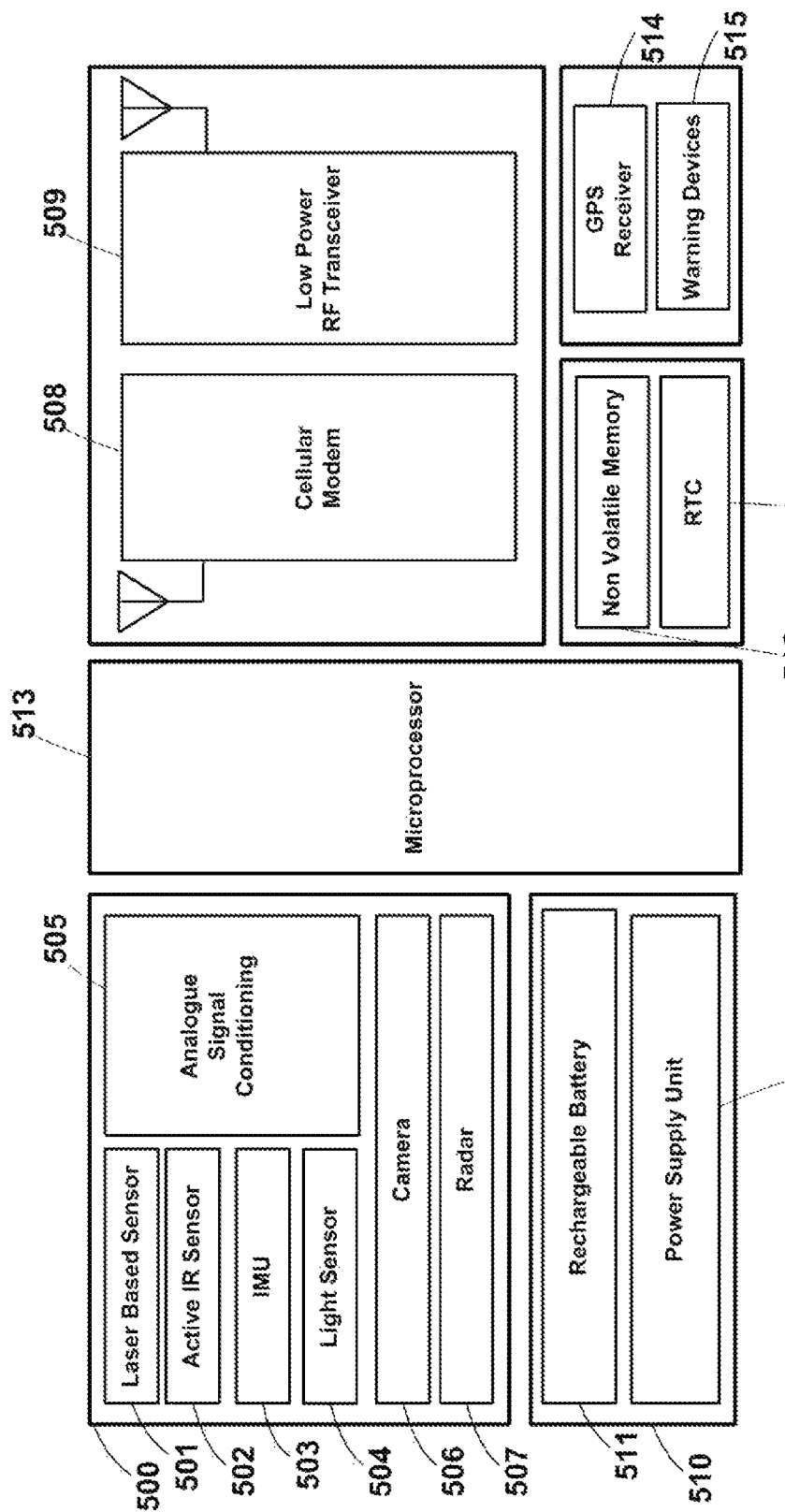
FIG. 5 is a block diagram of the components and functionality of a train detector cone in accordance with an exemplary embodiment of the present invention.

Turning to FIG. 5, the components, functionality, and operability of a train detector cone (TDC) as previously discussed will now be described. The block labeled 500 includes various sensors used by the TDC to detect an oncoming train. Sensor 501 is a laser rangefinder which detects the presence of a train by firing a laser pulse and then receiving back a portion of the laser beam reflected by the train. The laser pulse travels at the speed of light and as the speed of the laser beam is known, the distance of the train can be calculated from the time taken for the beam to return back to the receiving end of the laser rangefinder. Sensor 502 is an active infrared sensor which uses an active infrared transmitter and receiver for train detection. The transmitter emits a beam of infrared pulses that is reflected back by the train. The receiver receives the reflected infrared beam and detects the presence of a train based on the intensity of the received infrared beam. Another sensor used for train detection is a frequency modulated continuous wave (FMCW) radar at block 507. The FMWC radar requires only a small amount of power to transmit and continuously emits frequency modulated radio waves, some of the emitted radio waves are reflected back by an approaching train, those reflected waves are sensed by the receiving antenna to detect the presence and movement of a train. Any commercially available FMCW radar may be used, such as an R-Gage QT50R-AFH radar unit.

As seen at block 503, the TDC includes an Inertial Measurement Unit (IMU). The IMU detects any changes in the orientation of the train detector cone from its initial placement and deployment, and generates a tilt alarm if the cone becomes improperly oriented. For example, a train detector cone may fall down due to harsh weather or wind, improper placement on a surface, placement on a non-uniform surface, impact by other objects, or numerous other events. The tilt alarm is preferably an audible and/or a visual alert to a nearby operator to indicate that the train detector cone is not aligned properly. The TDC tilt alarm is further communicated over the wireless mesh network (as described previously) to all the personnel warning. The communicated tilt alarm alerts the personnel warning cones that the train detector cone needs corrective action to reliably detect the incoming trains. [Preferably, the personnel warning cones and personal alert devices provide an audible and/or visual indication of receipt of the tilt alarm signal indicating a problem with the TDC.

An analog signal conditioning unit 500 is used to process the analog signals originating at the various described sensors such that those signals can be used for further processing. As is known in the art, the analog signal conditioning unit provides gain and offset adjustments if necessary, and further provides filtering in order to remove unwanted noise components from the sensor signals.

As also depicted in FIG. 5, a low power RF transceiver 509 provides wireless communication between the train detector cone and personnel warning cones. Preferably, a low power ISM band radio, such as the XBee-PRO 900HP module, is used in the train detector cone to establish and enable wireless communication links with the other devices.

Most preferably, the transceiver provides frequency hopping spread spectrum operation in the 900 MHz ISM frequency band and uses DigiMesh wireless networking protocol to form a wireless mesh network. Cellular modem 508 provides communication with remote server 108 (as depicted in FIG. 1). The cellular communication and modem is suitably provided by a Hame A16 3G module, although any other suitable communication means known in the art may also be used for that purpose.

Block 510 depicts the components used to supply power to the train detector cone. Power is preferably provided by a rechargeable lead acid battery 511, with a voltage rating of 12V and a capacity of 10 Ah. Most preferably, the battery provides up to 20 hours of continuous train detector cone operation. A power supply unit 512 is also included in the train detector cone, the power supply unit is operable to convert the battery voltage according to the power requirements of each individual component used in the train detector cone. The power supply unit is also operable to monitor battery voltage in order to keep track of the state of charge of the rechargeable battery and generate alerts if the battery is getting low.

GPS receiver 514 provides positioning and geolocation information to the train detector cone. A Garmin GPS 18x PC Receiver provides suitable positioning information although other known GPS receivers from other manufacturers may likewise be used.

Warning devices 515 include LEDs and a speaker to produce visual and audible alerts for various conditions as described previously.

Microprocessor 513 is operable to execute the software implementing the core logic of the train detector cone, including a startup verification of the various train detector cone components.

The microprocessor is primarily operable to process data received from the various sensors described previously. In operation, the microprocessor receives train detection signals from sensor block 500 (as previously described) and, based on various functional parameters and logic, processes these signals to determine if a train is present or moving on the track.

The microprocessor is further operable to implement the execution of the self-healing mesh network formation algorithm as previously described. The microprocessor continuously monitors the wireless network by transmitting heart beat messages to the personnel warning cones and waits for acknowledgements. Based on the type of acknowledgment received, the microprocessor updates the best available routes and nodes in the network. This continuous monitoring allows the microprocessor to determine available alternate paths in the case of a broken communication link between two nodes. The microprocessor also includes logic to assess unanswered messages from a personnel warning cone in order to generate a special alert that a particular personnel warning cone is not functioning properly.

In addition, the microprocessor implements instructions to effect a battery voltage-monitoring algorithm which periodically monitors the battery voltage and compares the current voltage to a predefined threshold. If the current battery voltage is below the preset voltage threshold, the train detector cone generates audible and visual alerts in order to notify nearby personnel that the train detector cone battery needs to be recharged.

The microprocessor is further operable to prepare data packets to be transmitted to the personnel warning cones, and most preferably encrypts the transmitted data messages for safe transmission. Because the train detector cone is the only node that communicates directly with the server (i.e., the personnel warning cones do not communicate directly with the server), it is also a responsibility of the microprocessor to communicate all the alerts and status information to the central server over the cellular connection.

Looking still to FIG. 5, the train detector cone includes a non-volatile memory 516 in communication with the microprocessor, the memory is used to store configuration parameters required for various components of train detector cone. In addition to the non-volatile memory, the train detector cone comprises a real time clock RTC 517, which provides a real time clock signal to the microprocessor to allow precise time tamps for various events to be recorded in log files.

Figure 6:
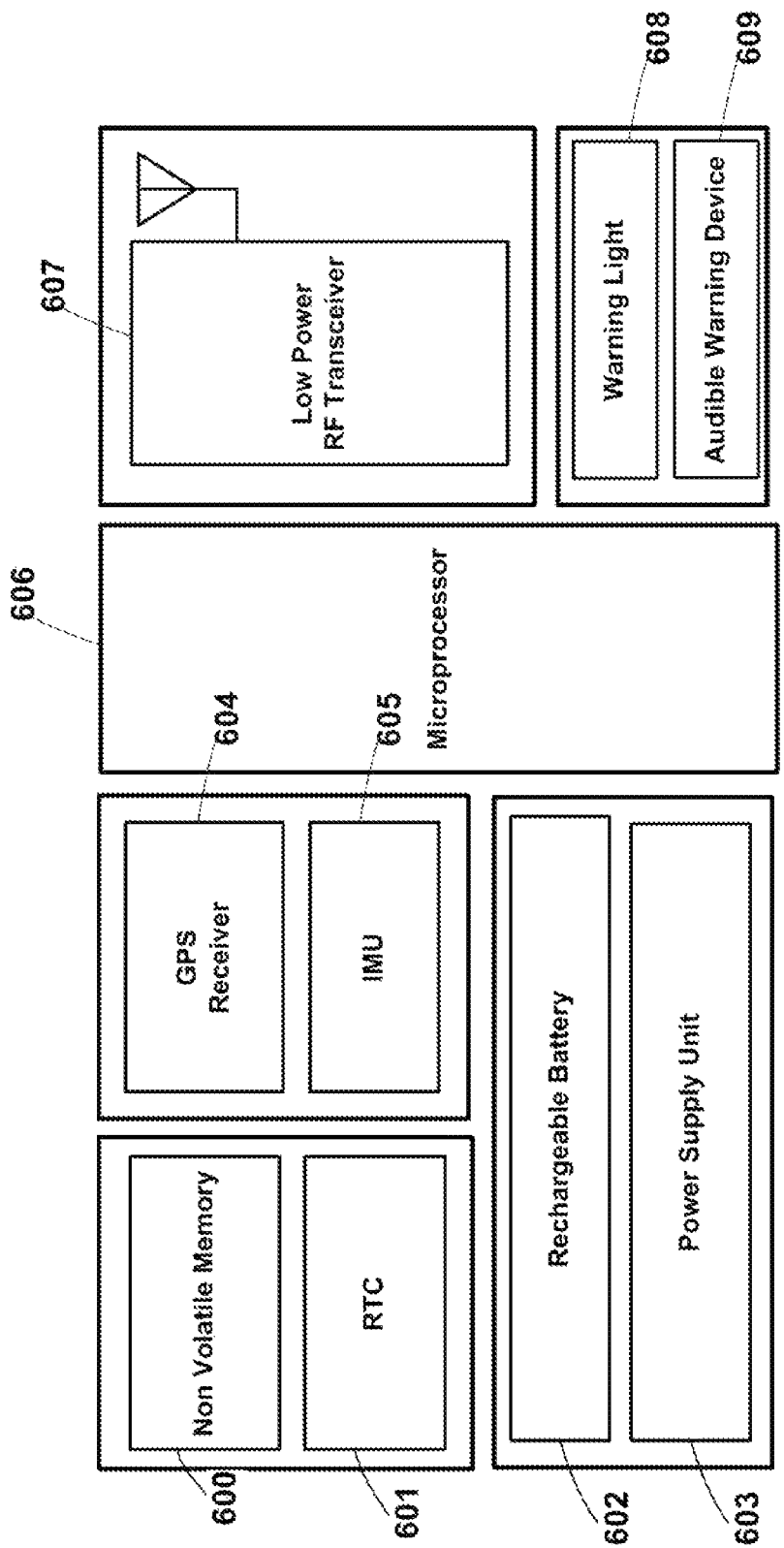
FIG. 6 is a block diagram of the components and functionality of a personnel warning cone in accordance with an exemplary embodiment of the present invention.

Looking now to FIG. 6, the components, functionality, and operability of a personnel warning cone (PWC) as previously discussed will be described. A microprocessor 606 is operable to execute instructions implementing the core logic of the personnel warning cone, including a startup verification which initializes the various components of the PWC to a proper functioning state. In a manner similar to that described previously with respect to the train detector cone, the microprocessor of the PWC is further operable to execute logic for running a self-healing mesh network and for decryption of messages received from other cones. The microprocessor is also operable to generate an acknowledgement signal in response to the heart beat requests generated by train detector cone as previously described. And, the microprocessor is operable to receive and decode messages received from the train detector cone and to implement logic to take appropriate actions based on the content of those received messages.

The personnel warning cone is equipped with a battery 602 which provides power to the various components of the warning cone in a manner similar to that described with respect to the train detector cone. The battery preferably meets the same specification as that of the train detector cone, with a voltage rating of 12V and a capacity of 10 Ah. Because the personnel warning cone includes fewer components than the train detector cone, the similarly-sized battery provides a longer operation time to the personnel warning cone as compared to the train detector cone. Power supply unit 603 is operable to convert the battery voltage into desired voltages for the various components of a personnel warning cone. Furthermore, the power supply unit is operable to periodically provide voltage monitoring data to the microprocessor, such as the current battery voltage and state of charge.

Similar to the train detector cone, the PWC includes a GPS receiver 604 which provides position and geolocation information to the microprocessor. The position information of the PWC is communicated to the train detector cone and is used by the train detector cone to track each of the personnel warning cones active in the network. An inertial measurement unit (IMU) 605 generates audible and visual warnings to indicate to the nearby personnel that the personnel warning cone is not in a recommended position.

Non-volatile memory 600 is in communication with microprocessor 606, and parameters necessary for proper startup of the personnel warning cone as well as parameters for operating the wireless mesh communication network. Real time clock 601 provides timing and time stamp information in a manner similar to that previously described with respect to the train detection cone. Low power RF transceiver 607 is operable to transmit and receive RF messages. The XBee-PRO 900HP radio module, as used in the train detector cone, is likewise suitable for use in the personnel warning cone, although other radio modules may be employed within the scope of the invention. Warning light 608 provides visual warnings to the roadway workers when a warning signal is received from a train detector cone. Similarly, audible warning device 609, which may be a speaker or other sound generating or sound amplifying device, is operable to warn the roadway workers of an incoming train.

Figure 7:
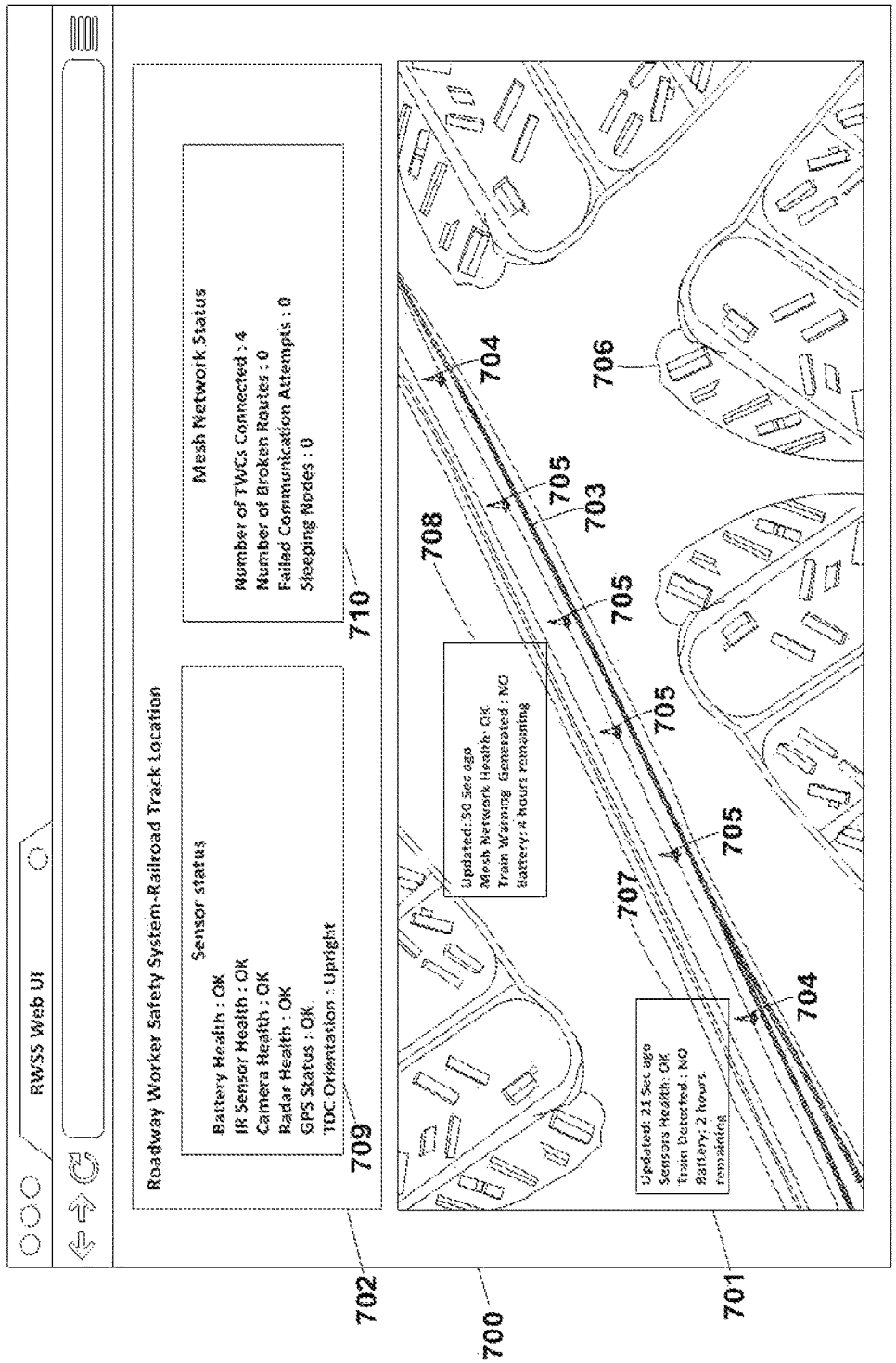
FIG. 7 depicts a web based user interface application to remotely view various parameters of train detector cones and personnel warning cones in accordance with an exemplary embodiment of the present invention.

Turning to FIG. 7, a screen shot of an exemplary web user interface (Web UI) for tracking and monitoring events of the roadway worker safety system (RWSS) of the present invention is depicted. The Web UI comprises a digital maps overlay 701 and RWSS status window 702. Digital maps overlay 701 displays a graphical image of the roadway worker safety system as deployed at a work location near a railroad track 703, with labeling 706 depicting and labeling the buildings near the railroad track. The exemplary deployed system includes representations of train detector cones 704 and several personnel warning cones 705. Status details for any of the devices shown in the digital maps overlay can be seen by clicking the specific device, which triggers a status box 707 pop-up displaying parameters for the selected device. As seen in the figure, status box 707 displays the time elapsed since the last status update, the overall health of sensors, the battery status, whether or not a train is detected and other useful information. A similar status box 708 is also depicted for a selected personnel warning cone, displaying the time elapsed since the last status update, the mesh network health status, whether a train warning is generated, and the battery status. The status window further includes a sensor status window 709 and a mesh network status window 710. Sensor status window 709 displays the battery health and health of all the active train detection sensors—such as IR sensor, camera sensor, radar, etc. Sensor status window 709 also displays the GPS coordinates and the current orientation of the train detector cone. The mesh network status window 710 displays parameters related to the wireless mesh network, including the number of devices which are currently included in the wireless mesh network, the number of broken communication routes, the number of failed communication attempts, the number of sleeping nodes, and other information relating to the network status. It should be understood that the user interface and the specific information displayed in the status windows are exemplary, and that the system of the present invention may be configured by a user to alter the displays from those depicted, and to allow a user or administrator of the system to customize the windows to display various information in various groupings as desired.

Figure 8:
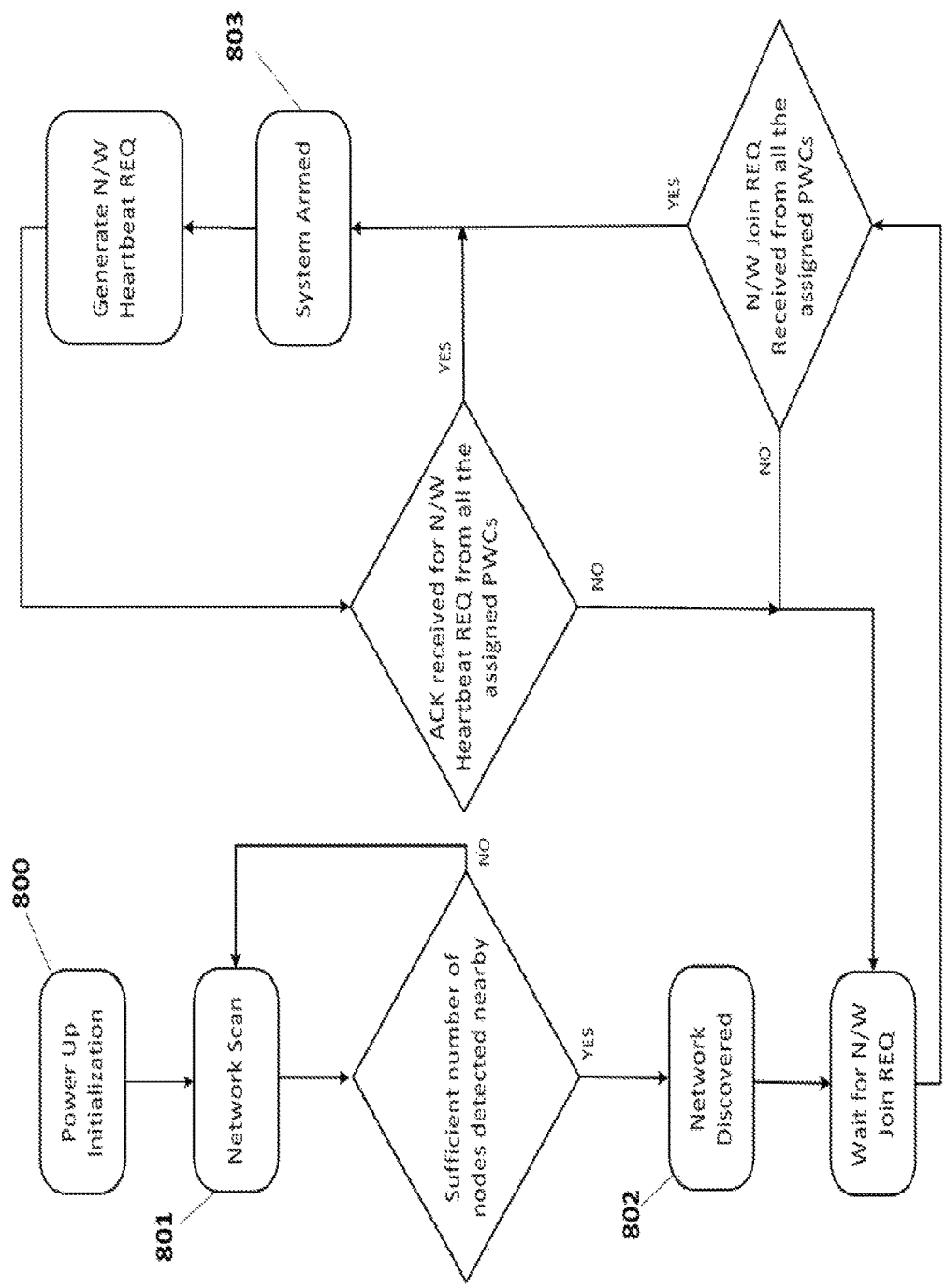
FIG. 8 depicts modes of operation of a train detector cone and the steps involved in forming a wireless mesh network in accordance with an exemplary embodiment of the present invention.

Turning to FIG. 8, a flow diagram of an exemplary implementation of a train detector cone establishing a self-healing wireless mesh network of the roadway worker safety system of the present invention is depicted. The method requires that a train detector cone (as previously described) is programmed with the MAC addresses of all the assigned personnel warning cones (as previously described) during system configuration. At power up (block 800) the train detector cone initializes the XBee-PRO 900HP radio module and various parameters of the DigiMesh network stack.

Once the radio module is initialized, at block 801 the train detector cone enters network scan and scans its radio interface to search for the assigned personnel warning cones operating nearby in the same radio channel.

If a sufficient number of devices are found the train detector cone moves on to the network discovered state 802 as shown in FIG. 8. While in the network discovered state the train detector cone waits for network join requests initiated by its assigned personnel warning cones and acknowledges the requests one by one. The acknowledgments of network join requests are generated by the train detector cone and the intermediate personnel warning cones relay those acknowledgments to the destination personnel warning cone using the built-in route discovery feature of the XBee-PRO 900HP radio module. Once the network join requests are received from all of the assigned personnel warning cones, at block 803 the train detector cone enters "system armed" mode. In system armed mode the train detector cone periodically generates network heartbeat requests (as previously described) to all of its assigned personnel warning cones. The period of heartbeat requests is configurable, preferably a heartbeat request is generated approximately every 30 seconds. If at any time an acknowledgement for network heartbeat request is missed by any of the assigned personnel warning cones, the train detector cone reverts back to its previous state and waits for a network join request from that particular personnel warning cone. The train detector cone also updates its records and routing table to mark the particular personnel warning cone as a "sleeping" node and transmits an alert to the remote server and all the other personnel warning cones in the network. While in the system armed mode the train detector cone is fully operational and capable of transmitting alerts related to train detection or other events to the assigned personnel warning cones over established wireless network in real time.

Figure 9:
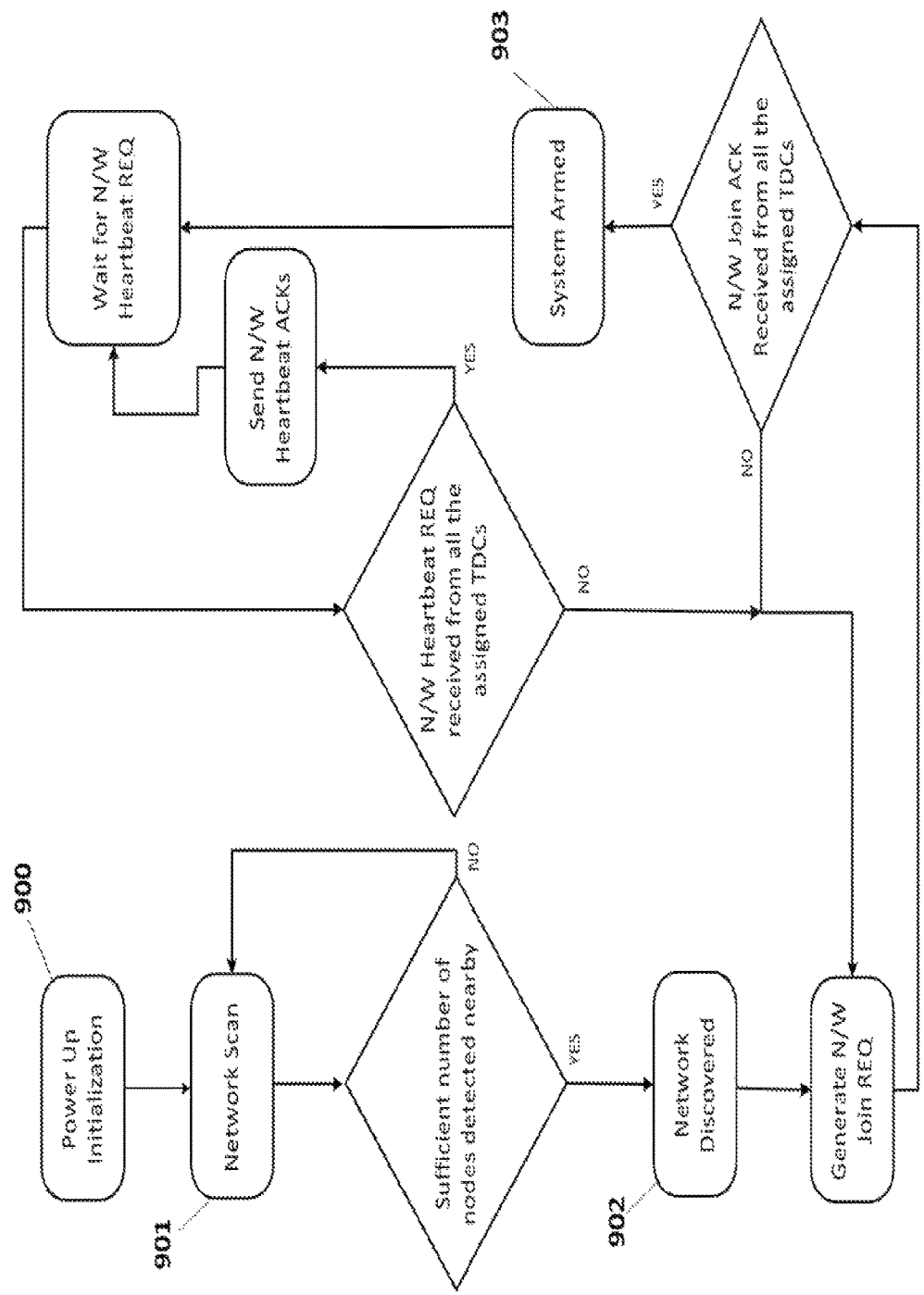
FIG. 9 depicts modes of operation of a personnel warning cone and the steps involved in forming a wireless mesh network in accordance with an exemplary embodiment of the present invention.

Similar to FIG. 8, FIG. 9 depicts a flow diagram of an exemplary implementation of a personnel warning cone during formation of self-healing wireless mesh network. The personnel warning cone is programmed with the MAC addresses of all the assigned train detector cones during system configuration. At power up 900 the personnel warning cone initializes the XBee-PRO 900HP radio module and various parameters of the DigiMesh network stack. Once the radio module is initialized the personnel warning cone enters network scan mode 901 and scans its radio interface to search for other personnel warning cones operating nearby in the same radio channel. If a sufficient number of devices are found the personnel warning cone moves on to the network discovered state 902. While in the network discovered state the personnel warning cone sends network join requests to its assigned train detector cones and waits for the acknowledgements. The network join requests are communicated to the destination train detector cone by the intermediate personnel warning cones using the built-in route discovery feature of the XBee-PRO 900HP radio module. Similarly, the acknowledgments of network join requests are generated by the train detector cone and the intermediate personnel warning cones relay those acknowledgments to the destination personnel warning cone using the same route discovery feature of the XBee-PRO 900HP radio module.

Once the network join requests are acknowledged by all assigned train detector cones the personnel warning cone enters "system armed" mode 903. In system armed mode the personnel warning cone waits for the periodic network heartbeat requests generated by its assigned train detector cones and sends acknowledgements upon reception of the heartbeat requests. All of the communications from train detector cones and personnel warning cones take place in the wireless mesh network using intermediate routes if a direct route is not available, as described previously. If at any time a network heartbeat request is not received from any of the assigned train detector cones, the personnel warning cone reverts to its previous state and sends a network join request to that particular train detector cone. While in the system armed mode the personnel warning cone is fully operational and capable of receiving alerts related to train detection or other events from its assigned train detector cones.

From the foregoing it will be seen that the invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A system for detecting an approaching train on an active railroad track or an adjacent track and providing an alert to roadway workers near a section of one or more of the active railroad track or the adjacent track over a secure wireless network, the system comprising:
   at least one train detector cone operable to detect the approaching train and transmit an alert signal in response, wherein said at least one train detector cone comprises a sensor unit comprising a plurality of simultaneously active sensors for detecting an oncoming train; and
   at least one personnel warning cone operable to receive said alert signal and generate one or more of an audible alert warning or a visual alert warning in response to said alert signal,
   wherein said at least one train detector cone transmits a tilt alert signal to said at least one personnel warning cone upon detection of a change in orientation of said at least one train detector cone, the tilt alert signal communicating a call for corrective action,
   wherein one or more of said at least one train detector cone or said at least one personnel warning cone are configured to perform a first routing algorithm to discover a first communications path between each of said at least one train detector cone and each of said at least one personnel warning cone, and
   wherein said at least one train detector cone is further configured to identify a subset of said at least one personnel warning cone that are one or more of malfunctioning or not functioning and to discover, based on the identified subset, a second communications path between each of said at least one train detector cone and each of said at least one personnel warning cone.

2. The system of claim 1, further comprising a remote server in communication with said at least one train detector cone, said remote server operable to receive and store data from said at least one train detector cone and to display at least a portion of said data on a user interface.

3. The system of claim 2, wherein said at least one train detector cone transmits status information to said remote server, said status information comprising one or more of GPS coordinates of said at least one train detector cone, GPS coordinates of said at least one personnel warning cone, or said data from said at least one train detector cone.

4. The system of claim 3, wherein said status information further includes one or more of a battery status of said train detector cone or a battery status of said at least one personnel warning cone.

5. The system of claim 3, wherein said status information further includes one or more of an orientation of said at least one train detector cone or an orientation of said at least one personnel warning cone.

6. The system of claim 2, wherein said remote server comprises a web server with internet cloud connectivity and non-volatile memory storage.

7. The system of claim 6, wherein said remote server presents on a display a location of said at least one train detector cone and a location of said at least one personnel warning cone overlaid on a digital map application running in a web browser.

8. The system of claim 1, further comprising at least one personal wearable device, said personal wearable device operable to receive said alert signal and generate one or more of a personal audible alert warning, a personal visual alert warning, or a personal tactile alert warning in response.

9. The system of claim 8, wherein said personal wearable device further comprises a low power radio transceiver and a Bluetooth transceiver.

10. The system of claim 8 wherein said personal wearable device further comprises a display operable to present graphical and text images to a user.

11. The system of claim 1 wherein said at least one train detector cone is configured to:
   receive a plurality of sets of train detection signals from said plurality of simultaneously active sensors, each of said plurality of sets of train detection signals corresponding to a respective sensor of said plurality of simultaneously active sensors;
   filter each of said plurality of sets of train detection signals;
   apply a plurality of signal adjustments to each of said plurality of sets of train detection signals; and
   process each of said plurality of sets of train detection signals to determine whether a first train is approaching.

12. The system of claim 1,
   wherein said plurality of simultaneously active sensors comprise at least a first sensor of a first sensor type and a second sensor of a second sensor type selected from a grouping of sensor types comprising: a) a laser range finder sensor, b) an active infrared sensor, c) a frequency modulated continuous wave radar sensor, d) a digital camera, and a e) an inertial measurement unit sensor, wherein the second sensor type is distinct from the first sensor type.

13. The system of claim 1, further comprising a cellular telephone modem operable to transmit data to a remote server.

14. The system of claim 11, wherein said at least one train detector cone further comprises a GPS receiver operable to provide position coordinates to a first microprocessor.

15. The system of claim 1, further comprising a warning device operable to provide one or more of said audible alert warning or said visual alert warning.

16. The system of claim 1, further comprising analog signal conditioning circuitry operable to filter noise from said plurality of simultaneously active sensors.

17. The system of claim 12, wherein said at least one train detector cone further comprises a radio transceiver comprising a frequency hopping ISM band spread spectrum radio.

18. The system of claim 12, wherein said at least one train detector cone further comprises a microprocessor that is further operable to execute logic to generate one or more train presence alerts based on an input of said plurality of simultaneously active sensors.

19. The system of claim 12, wherein said train detector cone further comprises:
   a low power radio transceiver operable to transmit one or more of said alert signal or said tilt alert signal; and
   a microprocessor operable to monitor data received from at least one of said plurality of simultaneously active sensors and to execute instructions directing an operation of said at least one train detector cone.

20. The system of claim 1, wherein said secure wireless network is any one of: a point to point network; a point to multipoint network; a tree network; and a mesh network.

21. The system of claim 1, wherein said at least one personnel warning cone comprises:
   a low power radio transceiver for receiving alert signals from other cones and transmitting acknowledgments in response;
   a warning device operable to generate one or more of audible warnings or visual warnings; and
   a microprocessor operable to monitor data received by said low power radio transceiver and to execute instructions directing an operation of said at least one personnel warning cone.

22. The system of claim 21, wherein said at least one personnel warning cone further comprises a GPS receiver operable to provide position coordinates to said microprocessor.

23. The system of claim 21, wherein said at least one personnel warning cone generates audible and/or visual alarms upon receipt of one or more of said alert signal or said tilt alert signal from said at least one train detector cone.

24. The system of claim 21, wherein said at least one personnel warning cone generates audible and/or visual alarms upon detection of a change in an orientation of said at least one personnel warning cone.

25. The system of claim 21, wherein said at least one personnel warning cone propagates signals received from said at least one train detector cone to at least one personal wearable device.

26. The system of claim 1, wherein said at least one train detector cone and said at least one personnel warning cone are configured to be placed along one or more sides of the active railroad track in an upright position with vertical orientation.

27. The system of claim 1, wherein said at least one train detector cone is configured to perform a first networking algorithm comprising:
   transmitting at least one heart-beat message to said at least one personnel warning cone;
   waiting for an acknowledgement signal from said at least one personnel warning cone;
   processing the acknowledgement signal from said at least one personnel warning cone;
   define a sub-network between said at least one train detector cone and said at least one personnel warning cone; and
   use said sub-network for communication between said at least one train detector cone and said at least one personnel warning cone.

28. The system of claim 1 wherein said at least one train detector cone is configured to:
   receive a plurality of sets of train detection signals from said plurality of simultaneously active sensors, each of said plurality of sets of train detection signals corresponding to a respective sensor of said plurality of simultaneously active sensors;

process each of said plurality of sets of train detection signals to identify one or more false alarms; and process each of said plurality of sets of train detection signals and said one or more false alarms to determine whether a first train is approaching.

29. A method of forming a self-healing wireless network of at least one train detector cone and a plurality of personnel warning cones for alerting one or more roadway workers of an approaching train, the method comprising:

powering up said at least one train detector cone and said plurality of personnel warning cones;

executing a routing algorithm to discover one or more cones in a vicinity of said at least one train detector cone and said plurality of personnel warning cones;

transmitting network join requests to the one or more cones;

accepting said network join requests and transmitting responsive network join acknowledgments;

transmitting via said at least one train detector cone a tilt alert signal upon detection of a change in orientation of said at least one train detector cone, the tilt alert signal communicating a call for corrective action; and acknowledging receipt of said tilt alert signal via one or more of said plurality of personnel warning cones, wherein said at least one train detector cone is operable to detect an oncoming train and transmit an alert signal in response and at least one personnel warning cone is operable to receive said alert signal and generate one or more of an audible alert warning or a visual alert warning in response to said alert signal.

30. The method of claim 29, further comprising: transmitting network heart-beat request signals and transmitting network heart-beat acknowledgments upon receiving said network heart-beat request signals.

31. The method of claim 29, wherein communication between said at least one train detector cone and said plurality of personnel warning cones takes place wirelessly in an ISM band.

32. The method of claim 29, wherein said self-healing wireless network is a wireless mesh network.

33. The method of claim 29, wherein said routing algorithm is an ad hoc on-demand distance vector routing algorithm.

34. The method of claim 29, wherein said self-healing wireless network is operable to discover new routes in an event any of said plurality of personnel warning cones is powered down.

\* \* \* \* \*